United States Patent
Badrinarayanan

(10) Patent No.: US 8,470,483 B2
(45) Date of Patent: Jun. 25, 2013

(54) WETTABLE GAS DIFFUSION LAYER FOR A WET SEAL IN A FUEL CELL

(75) Inventor: Paravastu Badrinarayanan, Manchester, CT (US)

(73) Assignee: UTC Power Corporation, South Windsor, CT (US)

( * ) Notice: Subject to any disclaimer, the term of this patent is extended or adjusted under 35 U.S.C. 154(b) by 824 days.

(21) Appl. No.: 12/515,600

(22) PCT Filed: Dec. 27, 2006

(86) PCT No.: PCT/US2006/049343
§ 371 (c)(1),
(2), (4) Date: Dec. 15, 2009

(87) PCT Pub. No.: WO2008/088310
PCT Pub. Date: Jul. 24, 2008

(65) Prior Publication Data
US 2010/0092811 A1     Apr. 15, 2010

(51) Int. Cl.
*H01M 4/94* (2006.01)
*H01M 8/04* (2006.01)
*H01M 8/10* (2006.01)

(52) U.S. Cl.
USPC ............ 429/437; 429/450; 429/468; 429/480

(58) Field of Classification Search
USPC .................. 429/437, 450, 457, 468, 480, 514
See application file for complete search history.

(56) References Cited

U.S. PATENT DOCUMENTS

| 5,840,414 | A | * | 11/1998 | Bett et al. | 428/307.7 |
| 6,165,634 | A | * | 12/2000 | Krasij et al. | 429/434 |
| 6,207,309 | B1 | * | 3/2001 | Bonville et al. | 429/437 |
| 6,379,827 | B1 | | 4/2002 | Cipollini | |
| 6,821,661 | B2 | | 11/2004 | Haridoss et al. | |
| 6,869,709 | B2 | * | 3/2005 | Shimotori et al. | 429/413 |

OTHER PUBLICATIONS

Search Report and Written Opinion mailed on Apr. 25, 2008 for PCT/US2006/49343.
Notification of Transmittal of International Preliminary Report on Patentability mailed on Oct. 22, 2009 for PCT/US2006/49343.

* cited by examiner

*Primary Examiner* — Stephen J. Kalafut
(74) *Attorney, Agent, or Firm* — Carlson, Gaskey & Olds, P.C.

(57) ABSTRACT

An example fuel cell stack (10, 40) includes a cathode plate (60) having oxidant flow passages (62) and coolant flow passages (64), and a porous anode plate (42) adjacent the coolant flow passages (64). The porous anode plate (42) includes fuel flow passages (46) and a network of pores (44) that fluidly connect the fuel flow passages (46) and the coolant flow passages (64). A membrane electrode arrangement (50) adjacent the fuel flow passages (46) generates electricity in a fuel cell reaction. A hydrophilic gas diffusion layer (48) between the membrane electrode arrangement (50) and the porous anode plate (42) distributes water from the coolant flow passages (64) to maintain or establish a wet seal (70) within the network of pores (44) that limits fuel transport through the network of pores (44) from the fuel flow passages (46) to the coolant flow passages (64).

18 Claims, 3 Drawing Sheets

WETTABLE GAS DIFFUSION LAYER FOR A WET SEAL IN A FUEL CELL

FIELD OF THE DISCLOSURE

This disclosure generally relates to fuel cells and, more particularly, to an arrangement and method for establishing a wet seal in a low coolant flow or evaporatively cooled type of fuel cell.

DESCRIPTION OF THE RELATED ART

Fuel cells are widely known and used for generating electricity in a variety of applications. Typically, a fuel cell unit includes an anode, a cathode, and an ion-conducting polymer exchange membrane (PEM) between the anode and the cathode for generating electricity in a known electrochemical reaction.

One example fuel cell is disclosed in U.S. Pat. No. 6,821,661 issued to Haridoss et al., which includes a membrane electrode assembly having an anode and a cathode. The membrane electrode assembly is located between a hydrophilic gas diffusion layer on the anode side and a hydrophobic gas diffusion layer on the cathode side. An anode plate adjacent the hydrophilic gas diffusion layer includes channels that deliver hydrogen to the anode, and a cathode plate adjacent the hydrophobic gas diffusion layer includes channels that deliver oxidant to the cathode. The hydrophilic gas diffusion layer condenses water that has evaporated from heat produced in the fuel cell reaction to prevent the membrane from drying out.

Another example fuel cell is disclosed in U.S. Pat. No. 6,379,827 issued to Cipollini, which includes a membrane electrode assembly having an anode and a cathode. The membrane electrode assembly is positioned between a hydrophilic anode substrate on the anode side and a cathode substrate on the cathode side. A porous anode separator plate (e.g. water transport plate) adjacent the hydrophilic anode substrate includes channels that deliver hydrogen to the anode, and a porous cathode water transport plate adjacent the cathode substrate includes channels that deliver oxidant to the cathode. A pump circulates water through coolant flow fields adjacent the anode plate and the cathode plate to cool the fuel cell. During operation, a pressure differential is maintained between the reactant gases and coolant. A hydrogen gas pressure within the porous anode plate and an oxidant gas pressure within the porous cathode plate limit water migration through the respective plates. However, upon shutdown of the fuel cell, the pressure differential is decreased to permit water migration through the plates into the hydrophilic anode substrate and the cathode substrate to protectively inert the fuel cell. The "wettable" characteristic of the hydrophilic anode substrate transports water to quickly inert the hydrophilic anode substrate.

Although the above example fuel cells are effective, there are opportunities for improvements in efficiency and cooling. For example, it is proposed to use evaporative, low pressure water flow to cool the fuel cell instead of circulating the water using a pump. In evaporative designs it is desirable to transport the water through the anode plate to the anode to absorb heat and evaporatively cool the fuel cell during operation. However, one problem of using an evaporative design is the increased requirement of water transport through the porous plates compared to conventional designs that use sensible cooling. Moreover, if hydrogen migrates out of the anode plate and away from the anode, it may mix with the oxidant and result in less efficient fuel cell operation.

Accordingly, there is a need for a fuel cell that provides water distribution and containment of the hydrogen fuel in the anode plate. The disclosed examples address this need while avoiding the shortcomings and drawbacks of the prior art.

SUMMARY OF THE DISCLOSURE

One example fuel cell includes a porous or solid cathode plate having oxidant flow passages and coolant flow passages, and a porous anode plate adjacent the coolant flow passages. The porous anode plate includes fuel flow passages and a network of pores that fluidly connect the fuel flow passages and the coolant flow passages. A membrane electrode arrangement adjacent the fuel flow passages generates electricity in a fuel cell reaction. A hydrophilic gas diffusion layer between the membrane electrode arrangement and the porous anode plate distributes water from the coolant flow passages to help maintain a wet seal within the network of pores that limits fuel transport through the network of pores from the fuel flow passages to the coolant flow passages.

One example method of operating the fuel cell includes the step of distributing water through the hydrophilic gas diffusion layer to flood the network of pores within the porous anode plate with the water and thereby establish the wet seal between the fuel flow passages and the coolant flow passages. For example, the water is distributed to circumvent a transient obstruction, such as an air bubble, associated with the porous anode plate that blocks water transport from one of the coolant flow passages to a dehydrated section of the porous anode plate.

The various features and advantages of this disclosure will become apparent to those skilled in the art from the following detailed description. The drawings that accompany the detailed description can be briefly described as follows.

DETAILED DESCRIPTION OF THE PREFERRED EMBODIMENTS

Figure 1:
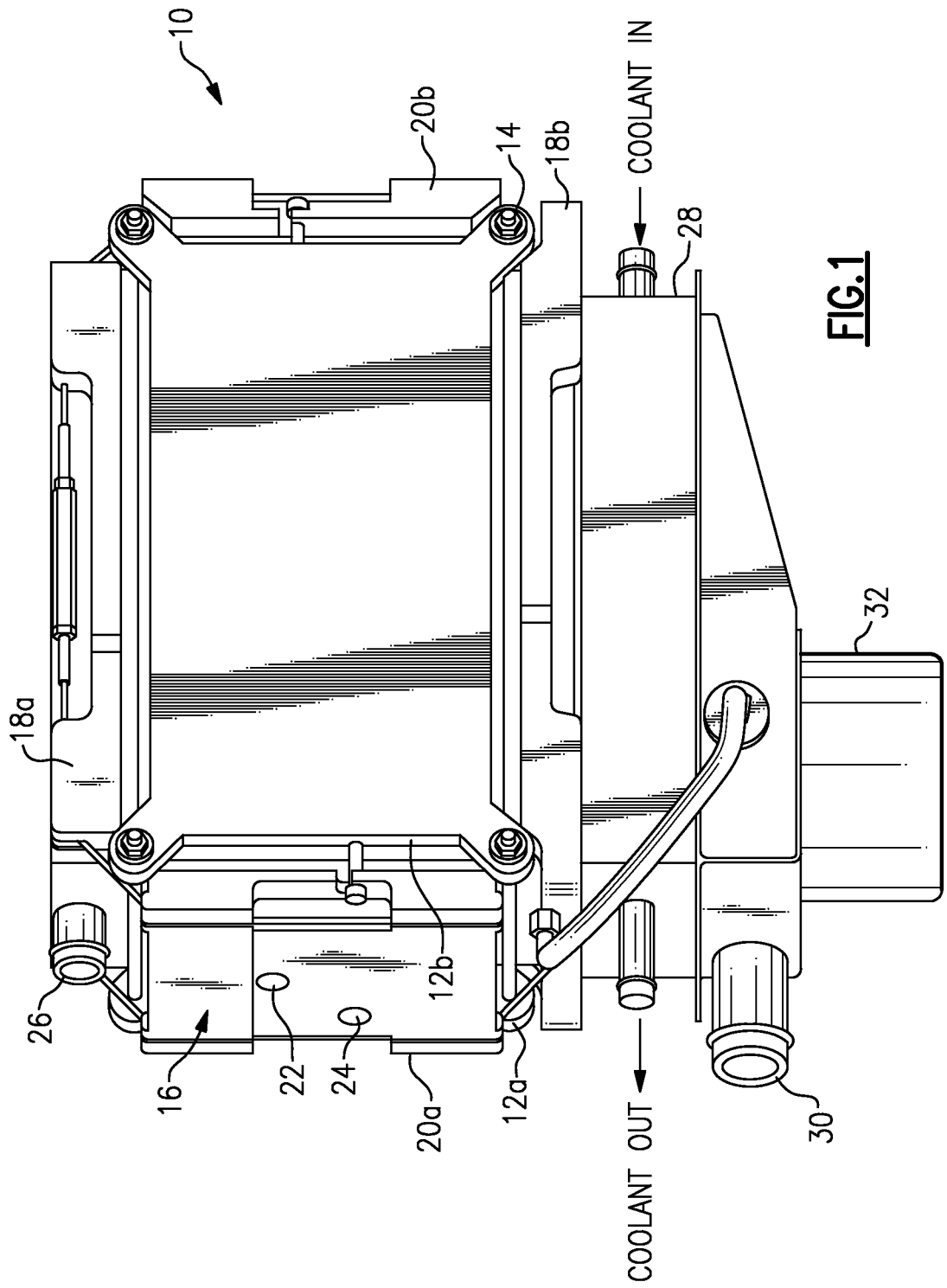
FIG. 1 illustrates selected portions of an example fuel cell.

FIG. 1 schematically illustrates selected portions of an example fuel cell 10 for generating electricity. In this example, fuel cell 10 is an evaporatively cooled fuel cell system 10, as will be described below. The fuel cell 10 includes a pair of pressure plates 12a, 12b secured together with tie rods 14. At least one unitized cell assembly 16 is secured between the pressure plates 12a, 12b. For example, more than one unitized cell assemblies 16 may be used between the pressure plates 12a, 12b to form a cell stack assembly 40 (shown in FIG. 3), depending on the desired amount of electricity to be generated.

The illustrated fuel cell 10 employs a "two-pass" design. A fuel manifold 20a delivers hydrogen fuel to the unitized cell assembly 16 through an inlet port 22. Fuel flows through a portion of the unitized cell assembly 16 and exits into a turnaround manifold 20b before re-entering another section of the unitized cell assembly 16. Any unused hydrogen fuel exits through an exhaust port 24 in the fuel manifold 20a. Given this description, one of ordinary skill in the art will recognize the application of the disclosed examples to other fuel cell arrangements, such as "one-pass" designs where hydrogen fuel enters through the fuel manifold 20*a* and exits through the manifold 20*b*.

The fuel cell 10 also includes an air inlet manifold 18*a* and an air exit manifold 18*b* for delivering air (i.e., an oxidant) to the unitized cell assembly 16. Air flows in through an inlet port 26, flows vertically downward through the unitized cell assembly 16 (one-pass), passes through a heat exchanger 28, and exits through an exhaust port 30. An accumulator 32 collects condensed water and returns water to the unitized cell assembly 16 as needed.

Figure 2:
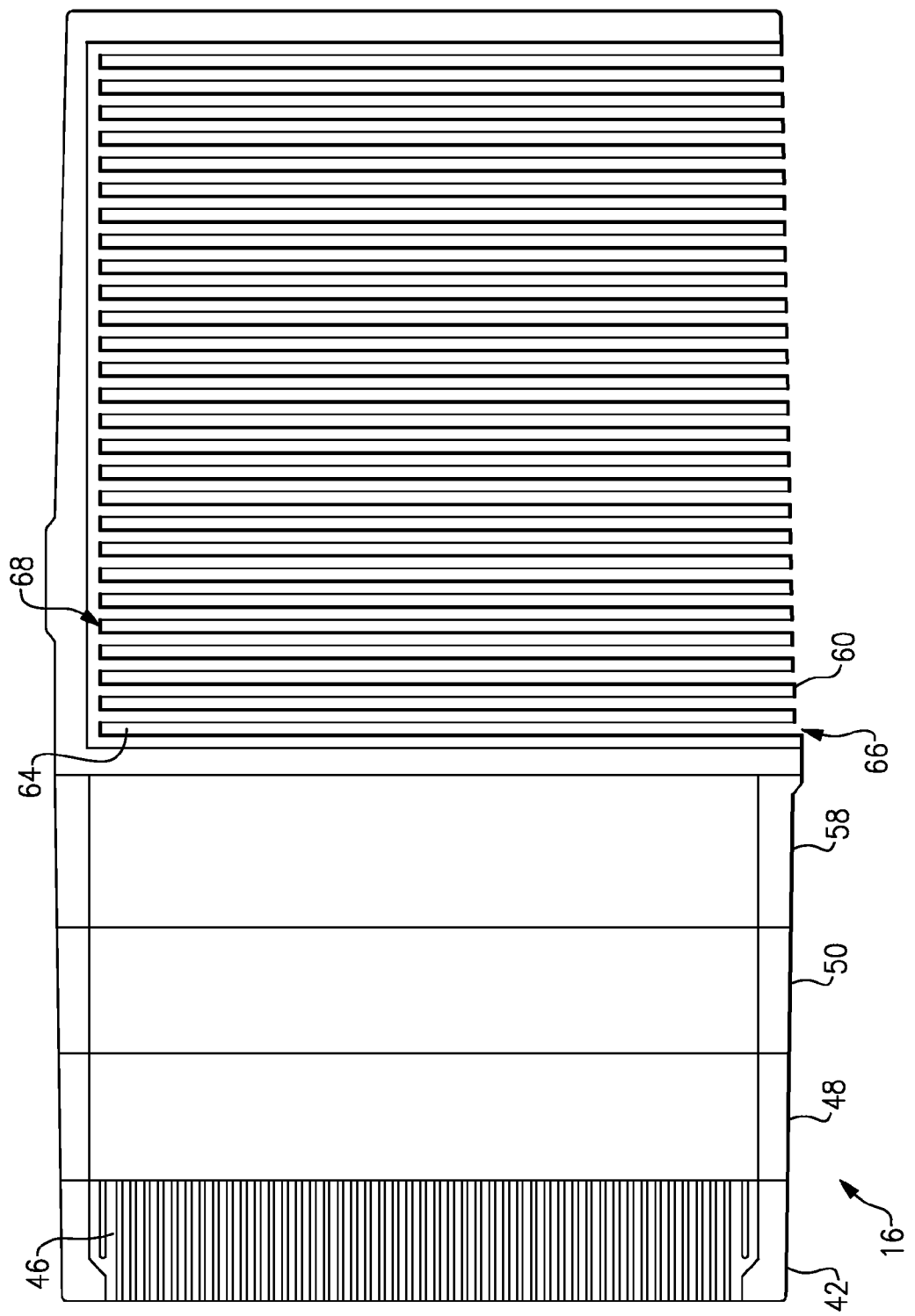
FIG. 2 illustrates an example unitized cell assembly of the fuel cell of FIG. 1.
Figure 3:
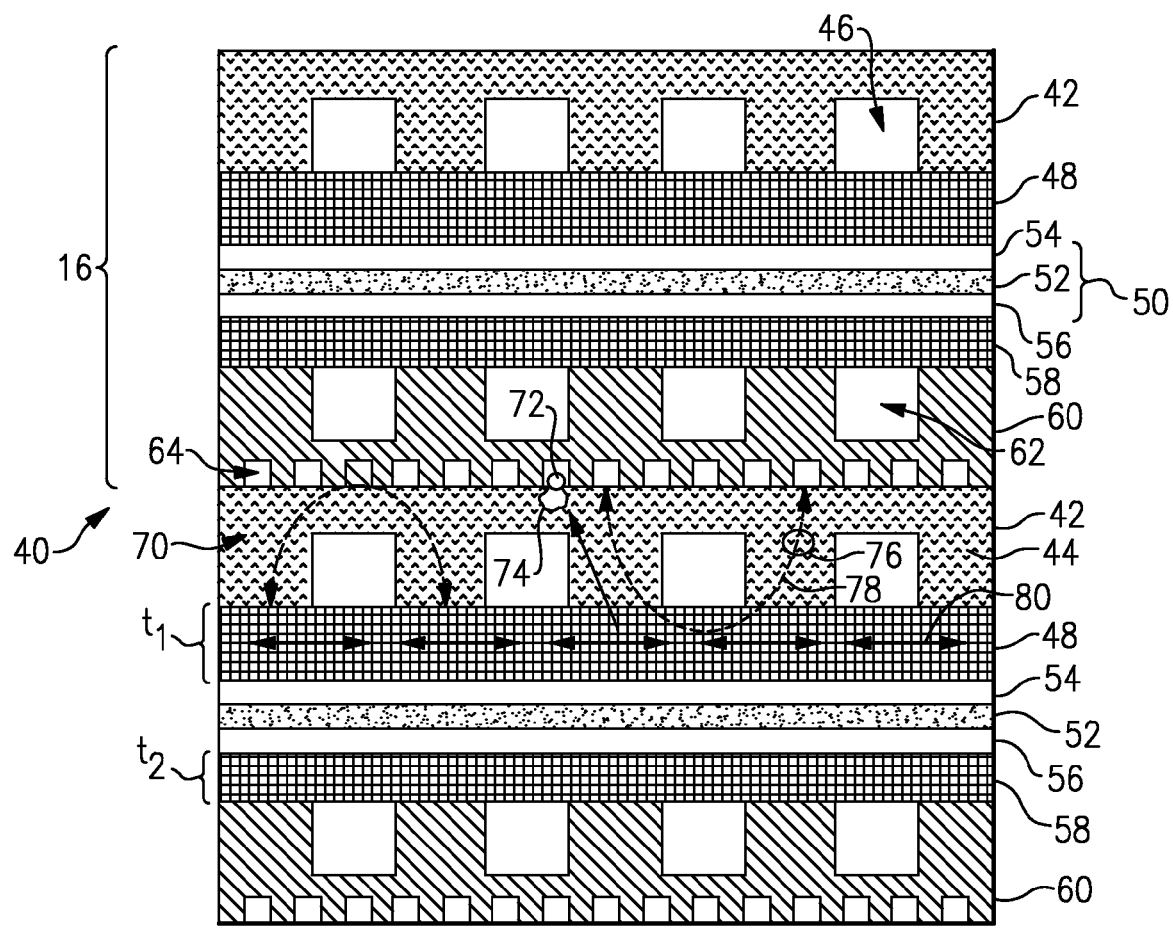
FIG. 3 illustrates several unitized cell assemblies in an example fuel cell stack.

Referring to FIGS. 2 and 3, FIG. 2 illustrates an exploded cutaway view of one example of the unitized cell assembly 16, which includes a stack of layers that function to transport the hydrogen fuel, air, and water. FIG. 3 illustrates a cross-sectional view of several unitized cell assemblies 16 in a fuel cell stack 40. Starting with the bottom of the stack (the left in FIG. 2), the unitized cell assembly 16 includes a porous anode bipolar separator plate 42, also known as an anode water transport plate. In the disclosed example, the porous anode bipolar plate 42 is made of a porous material, such as graphite, having a network of pores 44 (shown schematically in FIG. 3). The porous anode bipolar separator plate 42 is hydrophilic to permit through-plane water movement, but the network of pores 44 is structured to restrict through-plane gas transfer to thereby form a wet seal 70.

One side of the porous anode bipolar separator plate 42 is flat and the other side includes passages 46 for transporting the hydrogen fuel. The passages 46 may be integral to the porous anode bipolar separator plate 42 (e.g. channels or protrusions), or may be external to the porous anode bipolar separator plate 42 (e.g. porous media).

The next layer in the unitized cell assembly 16 stack is a hydrophilic anode gas diffusion layer 48, which is on top of the porous anode bipolar separator plate 42 in the disclosed example. The hydrophilic anode gas diffusion layer 48 may have a single layer construction or a bi-layer construction. In one example, the anode gas diffusion layer 48 includes a single hydrophilic porous carbon substrate. In another example, the anode gas diffusion layer 48 includes a hydrophilic course-pore carbon substrate that faces towards the porous anode bipolar separator plate 42 and a hydrophobic fine pore carbon substrate that faces the opposite direction.

The anode gas diffusion layer 48 (e.g., the entire anode gas diffusion layer 48 for a single layer construction or the course-pore carbon substrate in a bi-layer construction) includes a "wettable" substance. For example, the "wettable" substance includes tin oxide applied to a carbon substrate to impart the hydrophilic characteristic of the anode gas diffusion layer 48. Other "wettable" substances include oxides of aluminum, niobium, ruthenium, tantalum, and titanium. The "wettable" substance is applied to the carbon substrate using electrochemical impregnation, soaking, coating, or other known application technique. Given this description, one of ordinary skill in the art will recognize other "wettable" substances and application processes to meet their particular needs.

The third layer in the unitized cell assembly 16 stack is a membrane electrode arrangement 50 (hereafter "MEA") that is located on top of the anode gas diffusion layer 48 in this example. The MEA 50 includes a polymer exchange membrane 52 between an anode catalyst 54 and a cathode catalyst 56. For example, the anode catalyst 54 and the cathode catalyst 56 are each supported on a carbon substrate.

The fourth layer in the unitized cell assembly 16 stack is a cathode gas diffusion layer 58, which may also be a single layer or a bi-layer construction similar to the hydrophilic anode gas diffusion layer 48.

The top layer in the unitized cell assembly 16 stack is a cathode bipolar plate 60, which is also referred to as a cathode water transfer plate. The cathode bipolar plate 60 may be porous, such as by using porous graphite, or solid. One side (facing towards the MEA 50) of the cathode bipolar plate 60 includes passages 62 for delivering the air, which flows from the top to the bottom of the unitized cell assembly 16 in the disclosed example. The passages 62 may be integral to the plate 60 (e.g. channels or protrusions), or may be external to the plate 60 (e.g. porous media). The other side of the cathode bipolar plate 60 (facing towards a corresponding porous anode bipolar separator plate 42) includes coolant passages 64 for transporting a coolant, such as water.

In the disclosed example, the coolant passages 64 are micro-channels that extend vertically in the unitized fuel assembly 16. The coolant passages 64 are schematically depicted on the cathode bipolar plate 60, but could also be located on the porous anode bipolar separator plate 42, or as a separate structure (not shown) between the porous anode bipolar separator plate 42 and cathode bipolar plate 60. Each coolant passage 64 includes an open end 66 for receiving water from the accumulator 32 and a closed, terminal end 68. In the disclosed example, the coolant passages 64 are smaller than the passages 62 (e.g., the coolant passages 64 have a cross-sectional area that is smaller than a cross-sectional area of the passages 62) and are sized to produce capillary forces to transport the water along the length of the coolant passages 64. A pressure head of water generates a driving force to transport the water and fill the coolant passages 64. Thus, little or no external force (e.g., pumping) is needed to transport water through the coolant passages 64. In some examples, the capillary forces are not enough to lift the water to the full height of the stack, and a small external vacuum pump (not shown) may be used to raise the level of water. In yet another example, at least some of the coolant passages 64 have an open terminal end 68, exiting into a manifold where a small "trickle flow" is maintained into a condenser 31 (not shown).

The water from the coolant passages 64 migrates into the porous anode bipolar separator plate 42 through the network of pores 44 into the anode gas diffusion layer 48 and into the cathode bipolar plate 60 (for a porous cathode bipolar plate) into the cathode gas diffusion layer 58 to maintain the MEA 50 in a hydrated state and cool the MEA 50. The water then evaporates into the anode and cathode reactant passages 46 and 62, respectively, along with product water generated at the cathode catalyst 56. If the cathode bipolar plate 60 is solid, additional water transport through the porous anode bipolar separator plate 42 provides approximately equivalent cooling.

The water within the network of pores 44 forms the wet seal 70 that functions as a gas barrier. The wet seal 70 limits, and in some examples prevents, gaseous hydrogen fuel from migrating through the network of pores 44 of the porous anode bipolar separator plate 42. The wet seal 70 thereby provides the benefit of limiting the hydrogen fuel from mixing with the water, or, if the cathode bipolar plate 60 is porous, also from mixing with the air. Therefore, establishing and maintaining the wet seal 70 promotes efficient operation of the fuel cell 10 by containing the hydrogen fuel for use in the fuel cell reaction at the MEA 50 to generate electricity.

Due to the relatively low pressure differential between the coolant passages 64, the hydrogen within the passages 62, and in some cases, the air within the passages 46, and the low amount of water flow in the coolant passages 64 during operation of the fuel cell 10 or fuel cell stack 40 compared to conventional fuel cell arrangements that circulate water using a pump, a gas bubble 72 within the water may temporarily lodge to the porous anode bipolar separator plate 42 within the coolant passages 64 of the cathode bipolar plate 60. In conventional fuel cell arrangements that utilize pumps, forces due to the water flow and the large pressure differential dislodge and carry the bubbles away. However, in the low water flow, low pressure differential designs of the disclosed examples, the bubbles may not dislodge and may obstruct water transport from the coolant passages 64 into the network of pores 44. An obstruction of water transport may thereby produce a localized dehydrated section 74. If the localized dehydrated section 74 becomes large enough to span between one of the coolant passages 64 and one of the passages 46 of the porous anode bipolar separator plate 42, the wet seal 70 becomes breached and hydrogen fuel may migrate into the coolant passages 64 or mix with the air, as described above.

To maintain the wet seal 70, the porous anode bipolar separator plate 42 and the hydrophilic anode gas diffusion layer 48 distribute the water (e.g., laterally) from a hydrated section 76 of the porous anode bipolar plate separator 42 to hydrate the dehydrated section 74, as indicated by the arrows 78 and 80. The "wettable" nature of the hydrophilic anode gas diffusion layer 48 permits transport of the water from the dehydrated section 74, along the hydrophilic anode gas diffusion layer 48, to the dehydrated section 74 to thereby provide the benefit circumventing the bubble 72 to maintain or establish the wet seal 70. Thus, when the bubble 72 blocks direct water transport between one of the coolant passages 64 and the dehydrated section 74, the hydrophilic anode gas diffusion layer 48 is able to distribute water to the dehydrated section 74.

Optionally, the hydrophilic anode gas diffusion layer 48 is sized to promote water distribution and water transport. For example, the hydrophilic anode gas diffusion layer 48 is thicker than normal to provide the benefit of greater water storage and water transport capacity. In one example, the hydrophilic anode gas diffusion layer 48 has a thickness $t_1$ that is greater than a thickness $t_2$ of the cathode gas diffusion layer 58. Given this description, one of ordinary skill in the art will recognize suitable thicknesses $t_1$ to meet their particular needs.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A fuel cell stack comprising:
    a solid cathode plate having oxidant flow passages on one side and coolant flow passages on an opposite side;
    a porous anode plate adjacent the coolant flow passages, the porous anode plate having fuel flow passages and a network of pores that fluidly connect the fuel flow passages and the coolant flow passages, and configured to provide a wet seal comprising a liquid within the network of pores from the coolant flow passages that limits fuel transport through the network of pores from the fuel flow passages to the coolant flow passages;
    a membrane electrode arrangement adjacent the fuel flow passages; and
    a hydrophilic gas diffusion layer between the membrane electrode arrangement and the porous anode plate, configured to distribute the liquid through the hydrophilic gas diffusion layer to a dehydrated section of the porous anode plate.

2. The fuel cell stack as recited in claim 1, wherein one of the coolant flow passages includes a first cross-sectional area and one of the fuel flow passages includes a second cross-sectional area that is greater than the first cross-sectional area.

3. The fuel cell stack as recited in claim 1, wherein the hydrophilic gas diffusion layer includes a carbon substrate infused with a substance having a metal oxide.

4. The fuel cell stack as recited in claim 1, wherein the hydrophilic gas diffusion layer includes a carbon substrate infused with a substance having tin oxide.

5. The fuel cell stack as recited in claim 1, wherein the hydrophilic gas diffusion layer includes a carbon substrate infused with a substance having titanium oxide.

6. The fuel cell stack as recited in claim 1, further comprising another gas diffusion layer located adjacent the membrane electrode arrangement such that the hydrophilic gas diffusion layer is located adjacent one side of the membrane electrode assembly and the other gas diffusion layer is located adjacent an opposite side of the membrane electrode assembly.

7. The fuel cell stack as recited in claim 6, wherein the hydrophilic gas diffusion layer includes a first thickness and the other gas diffusion layer includes a second thickness that is less than the first thickness.

8. The fuel cell stack as recited in claim 1, wherein at least some of the coolant flow passages includes an open end and a closed terminal end such that the liquid within each of the coolant flow passages enters through the respective open end and exits through the network of pores in the anode porous plate.

9. The fuel cell stack as recited in claim 1, wherein at least some of the coolant flow passages include an open end and an open terminal end such that the liquid within each of the coolant flow passages enters through the respective open end and exits through the network of pores in the anode porous plate and through the respective open terminal end.

10. A method of operating a fuel cell stack, the method comprising:
    providing a fuel cell stack having a porous anode plate that includes fuel flow passages, a cathode plate having oxidant flow passages and coolant flow passages, the plates on opposite sides of a membrane electrode arrangement with a first hydrophilic gas diffusion layer adjacent one side of the membrane electrode arrangement and the fuel flow passages and a second hydrophilic gas diffusion layer adjacent an opposite side of the membrane electrode arrangement and the oxidant flow passages, the membrane electrode arrangement including a polymer exchange membrane between an anode catalyst layer and a cathode catalyst layer, the anode catalyst layer and the cathode catalyst layer each including a respective porous carbon substrate that is separate and distinct from the first hydrophilic gas diffusion layer and the second hydrophilic gas diffusion layer; and distributing water from the first hydrophilic gas diffusion layer to flood a network of pores within the porous anode plate with the water and thereby establish a wet seal.

11. The method as recited in claim 10, including distributing the water from a hydrated section of the porous anode plate through the first hydrophilic gas diffusion layer to a dehydrated section of the porous anode plate.

12. The method as recited in claim 10, including distributing the water through the first hydrophilic gas diffusion layer to a dehydrated section of the porous anode plate, wherein the transient obstruction is between the dehydrated section and one of the coolant flow passages and blocks water transport from the one of the coolant flow passages to the dehydrated section.

13. The method as recited in claim 10, including distributing the water while operating the fuel cell stack to generate electricity.

14. The method as recited in claim 10, including moving the water through the coolant flow passages using only capillary forces.

15. A method of operating a fuel cell stack, the method comprising:
    providing a fuel cell stack having a porous anode plate that includes fuel flow passages, a cathode plate having oxidant flow passages and coolant flow passages, the plates on opposite sides of a membrane electrode arrangement with, a first hydrophilic gas diffusion layer adjacent one side of the membrane electrode arrangement and the fuel flow passages and a second hydrophilic gas diffusion layer adjacent an opposite side of the membrane electrode arrangement and the oxidant flow passages, the membrane electrode arrangement including a polymer exchange membrane between an anode catalyst layer and a cathode catalyst layer, the anode catalyst layer and the cathode catalyst layer each including a respective porous carbon substrate that is separate and distinct from the first hydrophilic gas diffusion layer and the second hydrophilic gas diffusion layer; and
    distributing water from the first hydrophilic gas diffusion layer to a section of the porous anode plate to thereby circumvent a transient obstruction associated with the porous anode plate that blocks water transport from one of the coolant flow passages to the section.

16. The method as recited in claim 15, wherein the transient obstruction is a gas bubble.

17. The method as recited in claim 10, wherein the cathode plate is solid.

18. The method as recited in claim 15, wherein the cathode plate is solid.

\* \* \* \* \*